Figure 1:
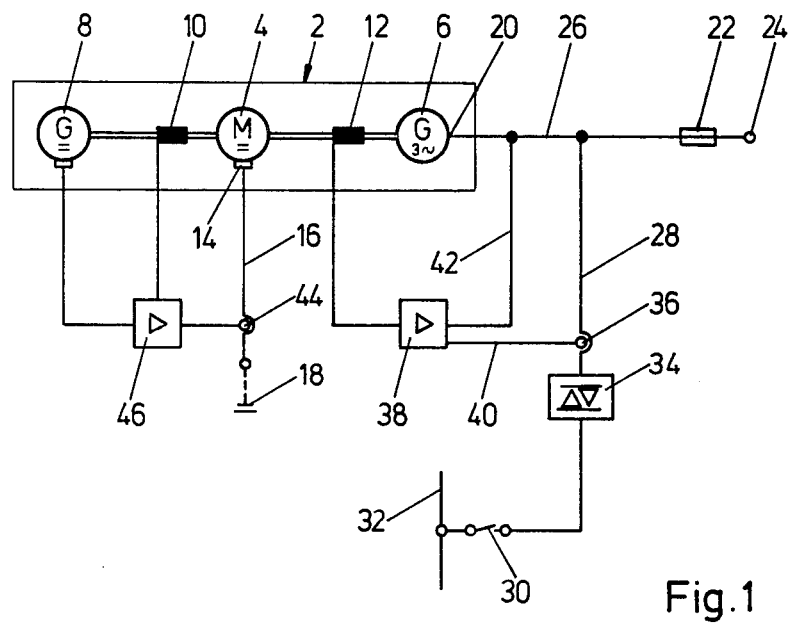

United States Patent [19]

Sachs

[11] 4,203,041
[45] May 13, 1980

[54] BATTERY/MAINS GENERATOR SET FOR THE PRODUCTION OF INTERRUPTION-FREE CURRENT

[75] Inventor: Klaus Sachs, Osterode, Fed. Rep. of Germany

[73] Assignee: Anton Piller KG., Osterode, Fed. Rep. of Germany

[21] Appl. No.: 938,882

[22] Filed: Sep. 1, 1978

[51] Int. Cl.² .............................................. H02J 9/06
[52] U.S. Cl. ...................................... 307/67; 307/68; 307/46; 322/16
[58] Field of Search ....................... 307/68, 67, 46, 47; 290/4 R; 310/113; 322/13, 16

[56] References Cited

U.S. PATENT DOCUMENTS

| | | | |
|---|---|---|---|
| 3,142,793 | 7/1964 | Grillo | 307/68 X |
| 3,514,625 | 5/1970 | Lane | 307/67 |
| 3,609,426 | 10/1971 | Gaul | 310/113 X |

*Primary Examiner*—L. T. Hix
*Assistant Examiner*—James L. Dwyer
*Attorney, Agent, or Firm*—Salter & Michaelson

[57] ABSTRACT

A battery/mains generator set for the production of a continuing electricity supply in the event of failure of the mains supply, the set comprising an a.c. machine capable of operating either as a generator or as a motor and, mechanically coupled thereto, a d.c. machine also operable either as a generator or as a motor, the a.c. machine being, in operation, permanently connected, with the mains supply through a static switch, which prevents back-flow of power into the mains, the a.c. machine, when mains driven, being operable as a motor and driving the d.c. machine, which then operates as a generator and charges a battery in accordance with a required I/V characteristic curve, and, on failure of the mains supply, the d.c. machine being operable as a motor powered by the battery to drive the a.c. machine as a generator, thereby providing an output supply to an external load in place of the mains supply, the set also including a current transformer connected to pass the reactive current flowing between the mains and the a.c. machine or the external load and to supply a potential regulator connected to control a controllable exciter winding of the a.c. machine, whereby the a.c. machine will be operated in accordance with the requirement of the external load for reactive power during mains operation.

9 Claims, 2 Drawing Figures

BATTERY/MAINS GENERATOR SET FOR THE PRODUCTION OF INTERRUPTION-FREE CURRENT

The invention concerns a battery/mains generator set for the production of interruption-free current including an a.c. generator driven by a battery-supplied d.c. motor.

In a known battery/mains generator set the battery and the coupled a.c. generator and d.c. motor are connected to the mains via a battery charging device designed for the full power consumed by the external load. With this method the full power required by the external load is permanently carried by the set. This leads to a high demand on the set and the battery-charging device.

An object of the invention is to design a battery/mains generator set which operates with low loss and which has a high reliability in service.

According to the invention, a battery/mains generator set comprises an a.c. machine capable of operating either as a generator or as a motor and, mechanically coupled thereto, a d.c. machine also operable either as a generator or as a motor, the a.c. machine being, in operation, permanently connected with the mains supply through a static switch, which prevents back-flow of power into the mains, the a.c. machine, when mains driven, being operable as a motor and driving the d.c. machine, which then operates as a generator and charges a battery in accordance with a required I/V characteristic curve, and, on failure of the mains supply, the d.c. machine being operable as a motor powered by the battery to drive the a.c. machine as a generator, thereby providing an output supply to an external load in place of the mains supply, the set also including a current transformer connected to pass the reactive current flowing between the mains and the a.c. machine or the external load and to supply a potential regulator connected to control a controllable exciter winding of the a.c. machine, whereby the a.c. machine will be operated in accordance with the requirement of the external load for reactive power during mains operation.

The a.c. machine preferably includes two in-phase stator windings, uncoupled from each other electrically and magnetically, which form two independent circuits which can be connected to two independent external loads. In this case the a.c. machine preferably has a damping cage designed to have a damping capacity sufficiently great that when a short circuit occurs in one of the external loads, the circuit of the other external load maintains a potential difference greater than 70% of the rated potential difference during a period of time required for the fusion of a safety fuse.

The d.c. machine preferaly has a fully non-magnetically plated yoke and is constructed with a compensation winding.

The static switch preferably consists of constructional elements which permit a current flow from the mains to the external load or loads only when synchronisation between the mains current and the current produced by the a.c. machine operating as a generator occurs. The static switch preferably consists of thyristor elements connected in an anti-parallel arrangement.

The a.c. machine is preferably a three-phase machine of a brushless type.

The d.c. machine may conveniently be coupled to an exciter d.c. generator which is connected to a speed regulator controlling a controllable exciter winding of the d.c. machine, the speed regulator also being responsive through a current transformer to the current flowing between the d.c. machine and the battery.

The a.c. machine, the d.c. machine and the exciter d.c. generator may conveniently be constructed as a unitary machine on a common shaft and having a common housing.

Figure 2:
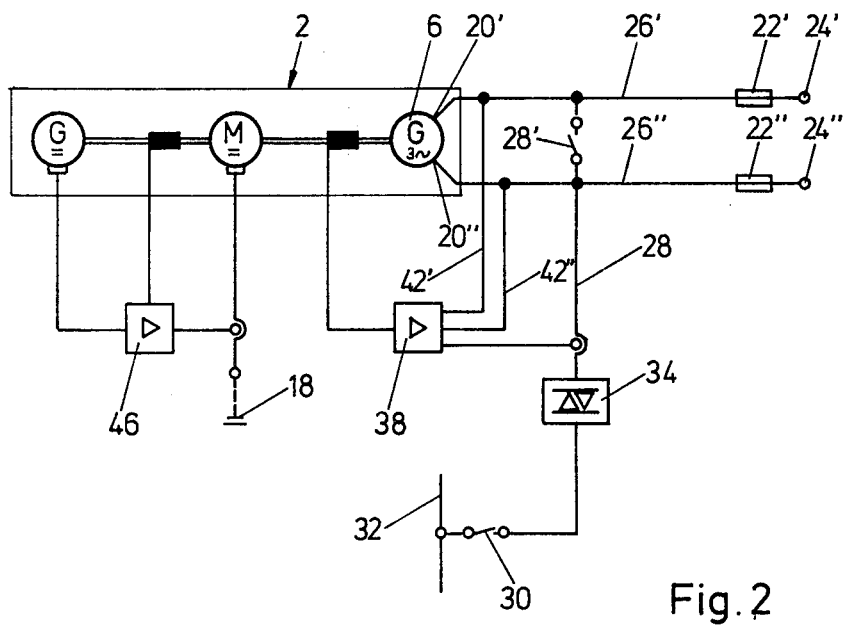

Two alternative battery/mains generator sets in accordance with the invention are now described with reference to the accompanying drawings, in which:

FIGS. 1 and 2 are respectively circuit diagrams of each of the sets.

Referring to FIG. 1, the first battery/mains generator set comprises a rotary electrical machine unit 2 including a d.c. motor 4 coupled to a three-phase generator 6. The unit 2 also includes a d.c. generator 8 coupled to the motor 4 and generator 6 to provide a potential output dependent on the speed of the d.c. motor 4. The d.c. motor 4 has an exciter winding 10 having a controllable output and similarly the three-phase generator 6 has an exciter winding 12 having a controllable output. The input 14 of the d.c. motor 4 is connected to a battery 18 via a lead 16.

The output 20 of the three-phase generator 6 is connected via the supply lead 26 to the load 24 through a safety fuse 22. In addition a mains supply lead 28 coected to the supply mains 32 through a switch 30 is connected to the supply lead 26. A static switch 34 is situated in the lead 28 with a current transformer 36 in series with it at the side thereof remote from the mains 32. The current transformer passes the reactive current.

A potential regulator 38 is connected to the exciter winding 12 of the three-phase current generator 6 and via a lead 40 to the current transformer 36 and a lead 42 to the supply lead 26. By means of the potential regulator 38, the potential difference of the exciter winding 12 of the three-phase current generator 6 is controlled as a function of the reactive current accepted by the load and the output potential difference of the generator.

A current transformer 44 is arranged in the lead between the d.c. motor 4 and the battery 18. The exciter winding 10 is supplied through a speed regulator 46 in dependence on the current flowing in the lead 16 and the potential difference provided by the d.c. generator 8.

When driven by the mains, the three-phase generator 6, which is permanently connected to the lead 26 and thus to the mains 32, acts as a three-phase motor. The field of the three-phase current generator is controlled as a function of the reactive current flowing to the load in such a way that the three-phase generator 6 operating as a motor feeds the necessary reactive current to the supply lead 26.

When the generator 6 is driven by the mains, the d.c. motor 4 operates as a d.c. generator and supplies the battery 18 via the lead 16 or provides the necessary current for charging the battery according to an I/V characteristic curve, which can be followed by controlling the exciter winding 10.

The static switch 34 preferably consists of thyristor elements connected in an anti-parallel manner and which guarantee substantially instantaneous switching.

If the mains should fail the d.c. motor 4, operating as a d.c. current generator when mains driven, switches to motor operation. The d.c. motor 4 receives power from the battery 18 and its speed is held constant by means of the speed controller 46. The current required by the load 24 is supplied by the three-phase generator 6 then being driven by the d.c. motor 4. An outflow or reflux of power from the supply lead 26, fed by the three-phase generator 6, to the mains 32 which is no longer providing power is prevented by the static switch 34.

When the potential difference of the supply returns, a flow of current from the mains to the supply lead 26 of the load 24 is prevented by the static switch 34 with its instantaneous switching antiparallel current devices until a coincidence of phase exists on the two sides of the switch 34. In this way the switch 34 brings about automatic synchronisation which is necessary for the fully automatic operation of the set.

In the circuit illustrated in both figures of the drawings, all lead connections are shown as single lines regardless of whether they are designed to be single phase or three-phase connections.

The battery/mains generator set according to the present invention is intended to provide an electrical supply to a load without interruption in the event of failure of the supply means, in particular, to loads sensitive to interruptions in the current. Such sensitive loads are, for example, computer installations. In order to provide an auxiliary current supply in computer installations, the latter are usually provided with two independent devices for current supply which are each to be fed from independent sources of current.

FIG. 2 shows the circuit diagram of a battery/mains generator set in accordance with the invention for the independent supply of two current source devices of a computer. In contrast to the generator set shown in FIG. 1, the three-phase generator 6 in this embodiment includes two electronically separate and magnetically uncoupled in-phase stator windings which form two electrically separate circuits connected respectively to the connecting leads 26', 26" for two separate current supply inputs 24' and 24" of the loads. The inputs 24' or 24" are protected by safety fuses 22', 22" respectively. The two supply leads 26' and 26" can be connected in parallel by means of a switch 28' for mains driving, said switch being opened automatically if the mains cut out.

The potential regulator 38 of the three-phase generator 6 is here connected via leads 42', 42" respectively to the supply leads 26' and 26".

All other components of the circuit are the same as in FIG. 1.

In the circuit shown in FIG. 2 it is necessary, if a short circuit should occur in one of the current supply units of the loads, to prevent the potential of the other supply unit from collapsing or from falling below a minimum permissible value. When a short circuit occurs in one of the current supply units a certain time is required for the safety fuse, which protects the circuit of this supply unit, to fuse. For this purpose a time of up to 80 milli-seconds, for example, may be needed. In order to maintain the current supply to the second current supply unit during fusion of the safety fuse the generator rotor is designed to have a damping cage having a damping capacity sufficiently high to ensure that during a short circuit in one of the current supply units of the circuit, a necessary minimum potential difference is maintained in the other current supply unit for a period of time required for the fusion of the safety fuse. It is possible in this case to prevent a potential decrease to less than 70% of the rated voltage, for example. Such a residual potential difference is sufficient in many cases, for example in certain computers, for the trouble-free maintenance of operation over the said period of time.

A generator of a brushless constructional type is preferably used as the three-phase generator.

Instead of a three-phase generator, a single-phase generator or other poly-phase generator may be provided.

In order to produce damping higher accuracy of frequency a fast reactive control of the field of the d.c. motor 4 may be provided.

In order to prevent damping which may prejudice the speed of the control the d.c. motor is preferably designed with a tin-plated or other non-magnetically plated yoke. To avoid feedback of rapid alterations in the armature current to the field a compensation winding may also be provided to neutralise the transverse field of the armature.

In an especially convenient form of the machine unit 2, the three-phase generator 6, the d.c. motor 4 and the d.c. generator 8 may be designed as a machine with a single housing and a single shaft.

What we claim is:

1. A battery/mains generator set for the production of a continuing electricity supply in the event of failure of the mains supply, the set comprising an a.c. machine capable of operating either as a generator or as a motor and, mechanically coupled thereto, a d.c. machine also operable either as a generator or as a motor, the a.c. machine being, in operation, permanently connected, with the mains supply through a static switch, which prevents back-flow of power into the mains, the a.c. machine, when mains driven, being operable as a motor and driving the d.c. machine, which then operates as a generator and charges a battery in accordance with a required I/V characteristic curve, and, on failure of the mains supply, the d.c. machine being operable as a motor powered by the battery to drive the a.c. machine as a generator, thereby providing an output supply to an external load in place of the mains supply, the set also including a current transformer connected to pass the reactive current flowing between the mains and the a.c. machine or the external load and to supply a potential regulator connected to control a controllable exciter winding of the a.c. machine, whereby the a.c. machine will be operated in accordance with the requirement of the external load for reactive power during mains operation.

2. A generator set according to claim 1, in which the a.c. machine includes two electrically separate and magnetically coupled in-phase stator windings which form two independent circuits which can be connected to two independent external loads.

3. A generator set according to claim 2, in which the a.c. machine rotor has a damping cage designed to have a damping capacity sufficiently great that when a short circuit occurs in one of the external loads, the circuit of the external load maintains a potential difference greater than 70% of the rated potential difference during a period of time required for the fusion of a safety fuse.

4. A generator set according to claim 1, in which the d.c. machine is constructed with a fully non-magnetically plated yoke and with a compensation winding.

5. A generator set according to claim 1, in which the static switch consists of constructional elements which permit a flow of current from the mains to the external load or loads only when synchronisation occurs between the mains current and the current produced by the a.c. machine operating as a generator.

6. A generator set according to claim 5, in which the static switch consists of thyristor elements connected in an anti-parallel arrangement.

7. A generator set according to claim 1, in which the a.c. machine is a three-phase machine of a brushless type.

8. A generator set according to claim 1, in which the d.c. machine is mechanically coupled to an exciter d.c. generator which is connected to a speed regulator controlling a controllable exciter winding of the d.c. machine, the speed regulator also being responsive through a current transformer to the current flowing between the d.c. machine and the battery.

9. A generator set according to claim 8, in which the a.c. machine, the d.c. machine and the exciter d.c. generator are constructed as a unitary machine on a common shaft and having a common housing.